(12) United States Patent
Mercier

(10) Patent No.: US 10,328,439 B2
(45) Date of Patent: Jun. 25, 2019

(54) THIMBLE FOR CYCLONE SEPARATOR

(71) Applicant: WAHL REFRACTORY SOLUTIONS, LLC, Fremont, OH (US)

(72) Inventor: Gilles Mercier, Brentwood, TN (US)

(73) Assignee: WAHL REFRACTORY SOLUTIONS, LLC, Fremont, OH (US)

( * ) Notice: Subject to any disclaimer, the term of this patent is extended or adjusted under 35 U.S.C. 154(b) by 344 days.

(21) Appl. No.: 15/209,229

(22) Filed: Jul. 13, 2016

(65) Prior Publication Data

US 2018/0015485 A1 Jan. 18, 2018

(51) Int. Cl.
| | | |
|---|---|---|
| A47L 5/36 | (2006.01) | |
| B04C 5/13 | (2006.01) | |
| B01D 45/16 | (2006.01) | |
| B01D 21/00 | (2006.01) | |
| F16B 2/06 | (2006.01) | |
| F27B 7/20 | (2006.01) | |
| F16M 13/02 | (2006.01) | |

(Continued)

(52) U.S. Cl.
CPC ............... *B04C 5/13* (2013.01); *B01D 45/16* (2013.01); *B01D 21/0087* (2013.01); *F16B 2/065* (2013.01); *F16B 47/00* (2013.01); *F16B 2001/0035* (2013.01); *F16M 13/02* (2013.01); *F16M 13/022* (2013.01); *F27B 7/20* (2013.01); *F27B 7/2016* (2013.01)

(58) Field of Classification Search
CPC ...... B04C 5/13; B01D 45/16; B01D 21/0087; F27B 7/20; F27B 7/2016; F16M 13/02; F16M 13/022; F16B 2/065; F16B 47/00; F16B 2001/0035

See application file for complete search history.

(56) References Cited

U.S. PATENT DOCUMENTS

| | | | | |
|---|---|---|---|---|
| 1,844,369 | A | * 2/1932 | Ross | B04C 5/13 55/412 |
| 3,273,320 | A | * 9/1966 | Delaune | B04C 5/081 55/434.1 |
| 3,470,678 | A | 10/1969 | Clark et al. | |

(Continued)

FOREIGN PATENT DOCUMENTS

EP 0 024 148 B1 2/1981

OTHER PUBLICATIONS

FLSMIDTH A/S, "One Source, Preheater calciner systems", 2011, pp. 1-8.

*Primary Examiner* — Dung H Bui
(74) *Attorney, Agent, or Firm* — Pearne & Gordon LLP

(57) ABSTRACT

A thimble assembly for a cyclone separator comprising a plurality of carrier brackets separately mountable on a shelf of the separator along the perimeter of a circular exhaust opening, a plurality of segments vertically successively suspended from the brackets, the segments of an upper row being joined to the brackets, the segments of each successive lower row being joined to the segments of row immediately above, each bracket exclusively serving a chord of an arc concentric with the circular opening that is substantially the same in length as the chord of an arc that a segment spans, a center-to-center chordal spacing of adjacent brackets being the same as a center-to-center distance of an adjacent pair of segments.

19 Claims, 5 Drawing Sheets

(51) Int. Cl.
*F16B 1/00* (2006.01)
*F16B 47/00* (2006.01)

(56) References Cited

U.S. PATENT DOCUMENTS

| | | | |
|---|---|---|---|
| 4,505,051 A | | 3/1985 | Herchenbach et al. |
| 4,651,783 A | * | 3/1987 | Christiansen .......... B01D 45/12 |
| | | | 138/107 |
| 4,961,761 A | * | 10/1990 | Johnson ................... B04C 5/085 |
| | | | 55/434.1 |
| 5,417,932 A | * | 5/1995 | Castagnos, Jr. .......... B01J 8/005 |
| | | | 422/147 |
| 5,441,081 A | * | 8/1995 | Maury .................... B04C 5/085 |
| | | | 138/107 |
| 6,024,874 A | | 2/2000 | Lott |
| 6,214,075 B1 | | 4/2001 | Filges et al. |
| 6,517,597 B2 | * | 2/2003 | Filges ..................... B04C 5/085 |
| | | | 55/435 |
| 6,837,913 B2 | * | 1/2005 | Schilling .................. B04C 5/13 |
| | | | 138/107 |
| 7,736,409 B2 | | 6/2010 | Rowley, Jr. et al. |
| 7,841,477 B2 | | 11/2010 | Hansen |
| 8,728,190 B2 | * | 5/2014 | Werchowski ............. B04C 5/13 |
| | | | 422/613 |
| 8,882,873 B2 | * | 11/2014 | Brownlee ................. B04C 5/13 |
| | | | 55/459.1 |
| 2003/0188519 A1 | | 10/2003 | Schilling et al. |
| 2012/0204526 A1 | | 8/2012 | Brownlee |
| 2012/0324847 A1 | | 12/2012 | Dupree et al. |

* cited by examiner

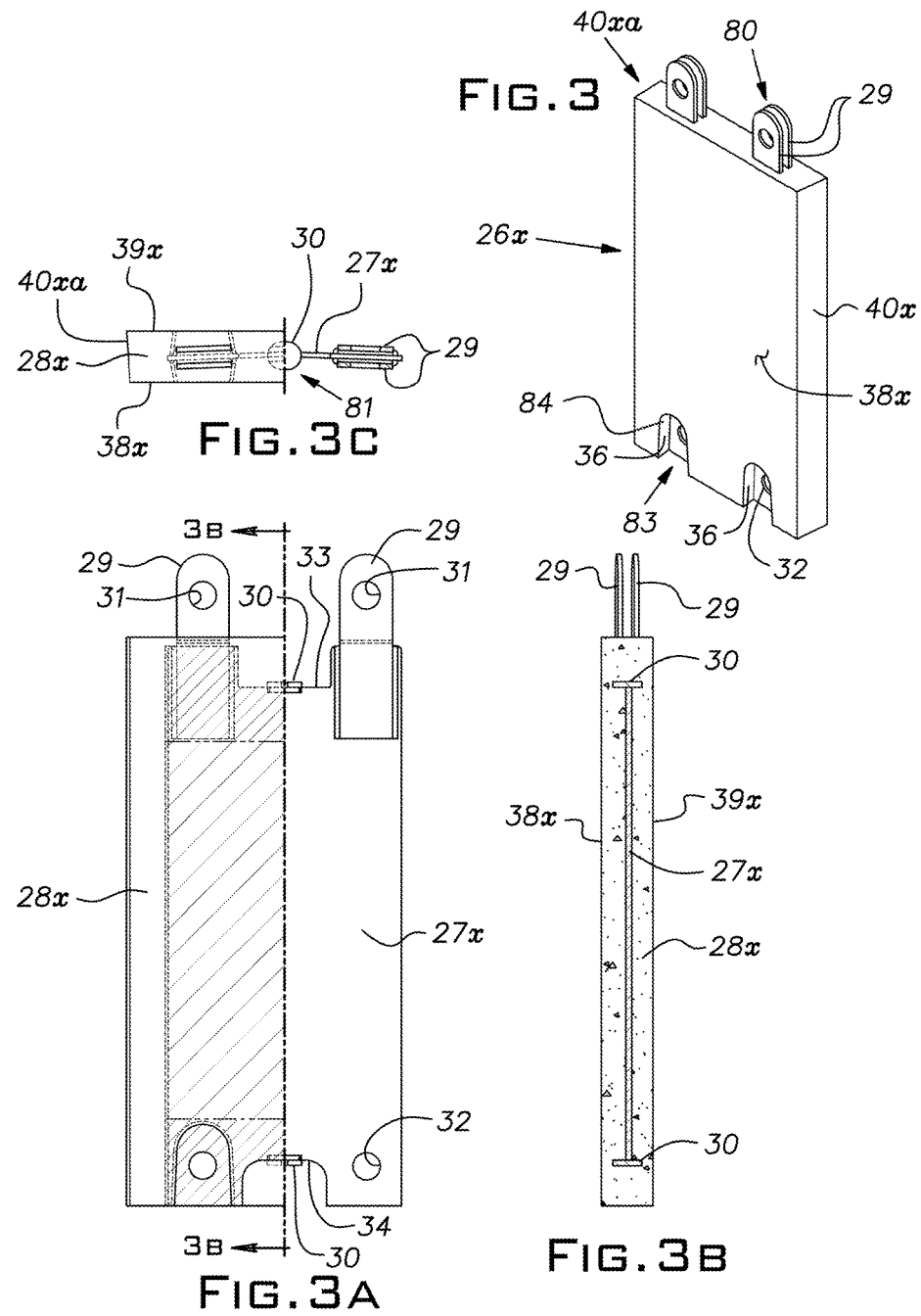

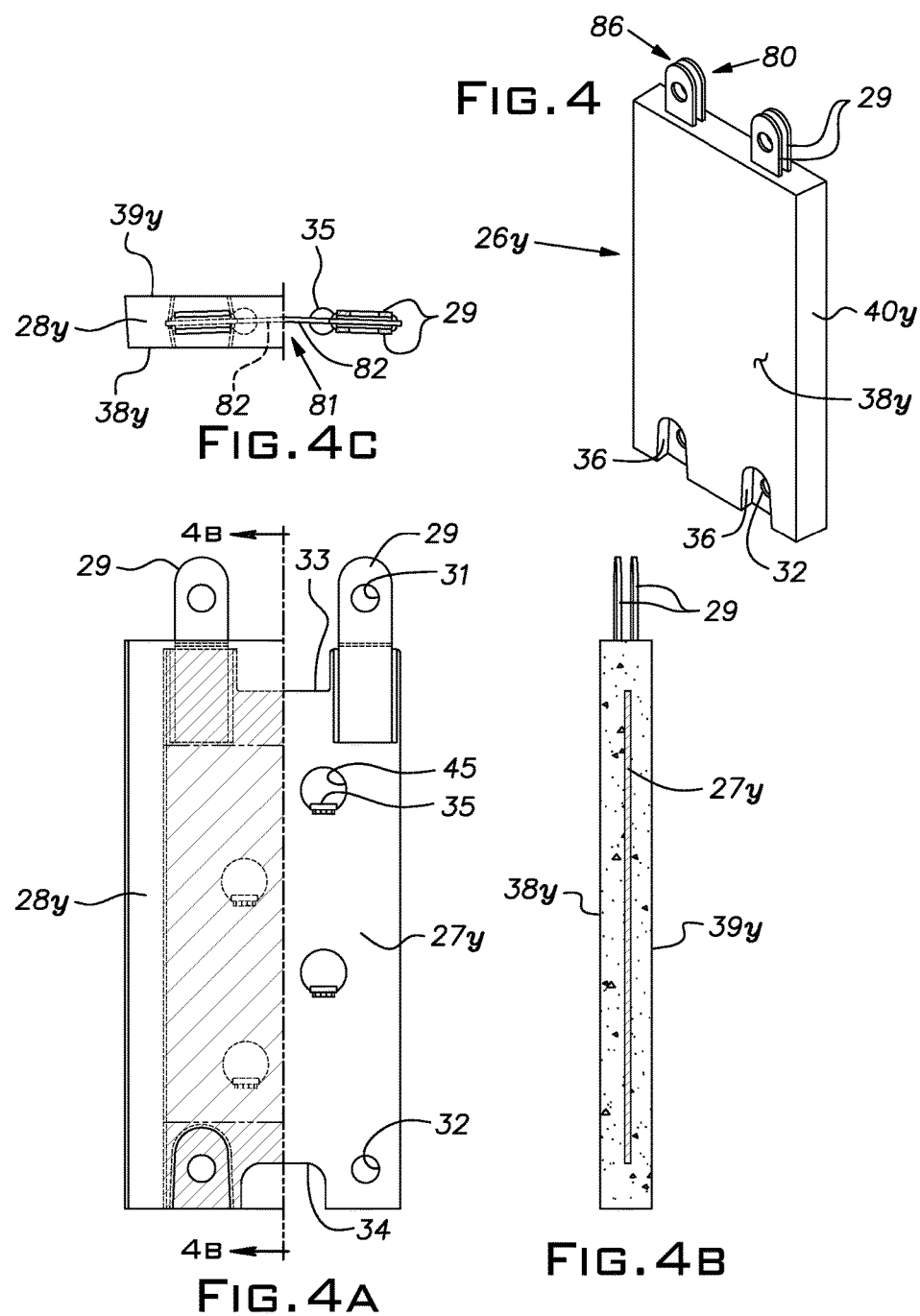

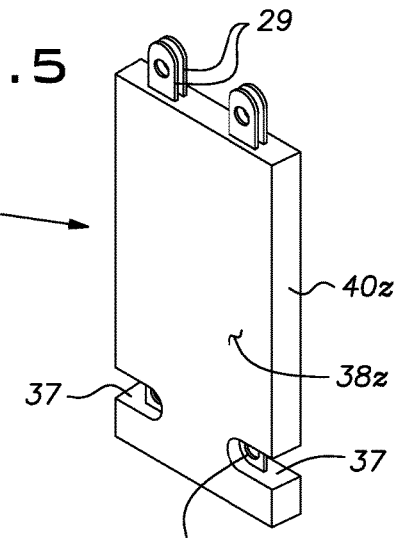
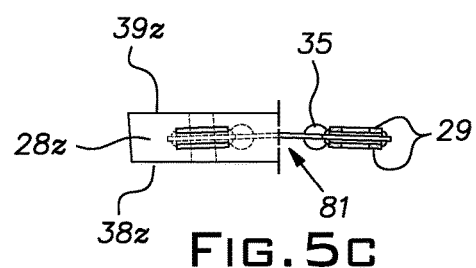
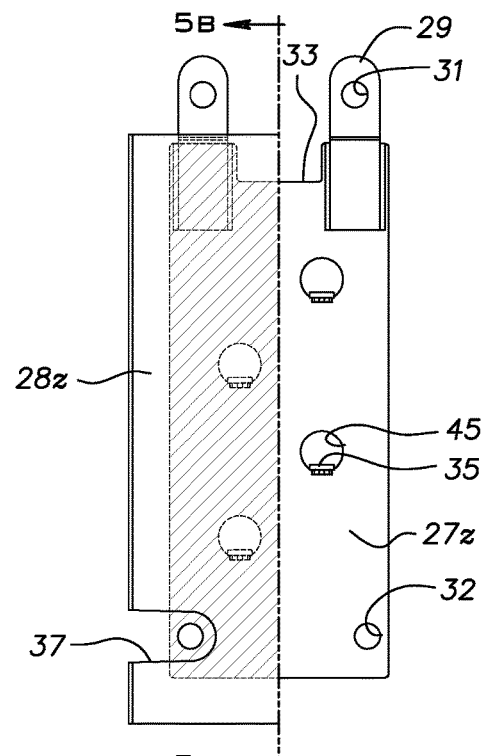
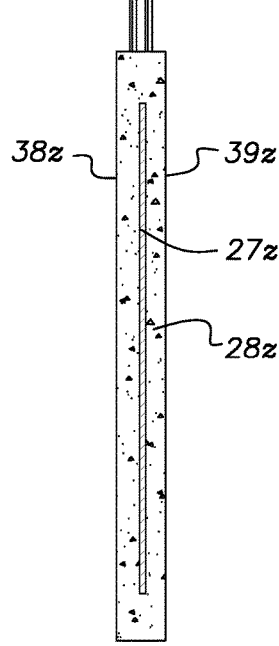

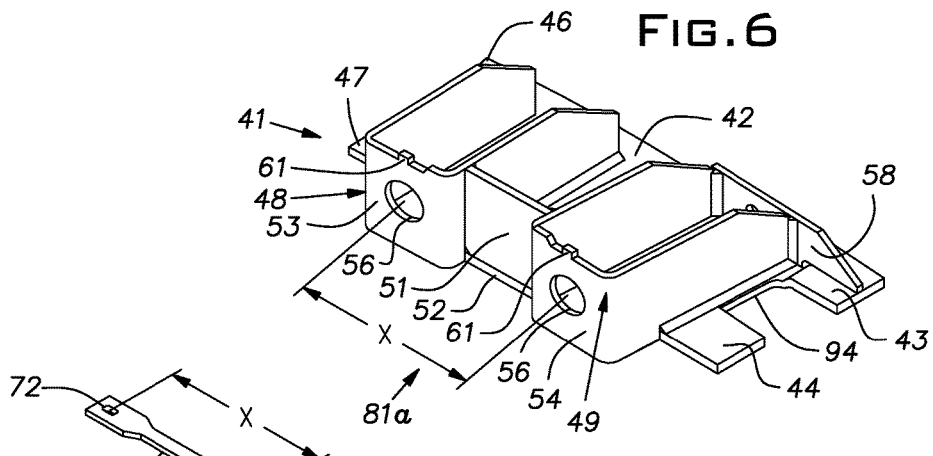
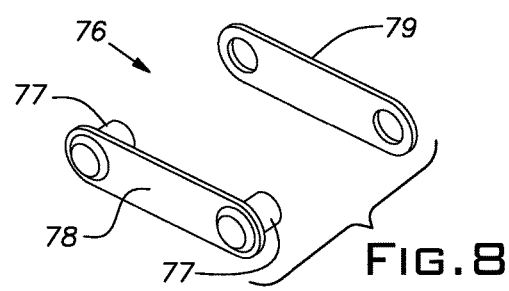
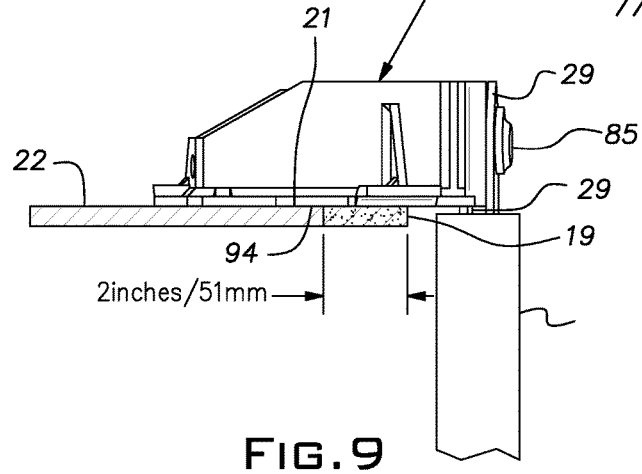

THIMBLE FOR CYCLONE SEPARATOR

The present invention relates to a thimble assembly for a cyclone separator particularly useful in high temperature, corrosive atmospheres.

BACKGROUND OF THE INVENTION

Cyclone separators are used in different applications where solid particulates suspended in a gas phase are to be separated from the gas phase. A separator typically comprises a cyclone housing having an upper substantially cylindrical part with an upwardly extending circular discharge for the gas phase, a lower conical part having an outlet at its narrow bottom for discharging particulate matter, a tangential inlet in the upper part for introducing the suspension which is to be separated, and a central circular structure called a thimble depending from a shelf at an upper wall of the housing. The thimble (which can also be referred to as a central tube, a vortex finder or a dip tube) is adjacent the outlet and extends from the shelf axially in the cyclone housing to a distal free open end. The thimble forces the incoming suspension to rotate around the outside of the cyclone creating rotation and a vortex in the center of the cyclone allowing gas to exit upwardly through the discharge duct and obstructs particulate matter from exiting upwardly so that the particulate matter exits through the outlet at the bottom of the conical part.

U.S. Pat. Nos. 4,505,051 and 7,841,477 describe cyclone separators; the contents of these patents and the contents of the patents cited in these patents are incorporated herein by reference.

Cyclone separators such as used in cement making plants operate at very high temperature, approaching 1000 degrees C. for example, and are exposed to corrosive materials. These harsh environments can degrade the thimble to a condition requiring its replacement long before the end of the working life of the cyclone separator.

Replacement of a thimble has been an expensive proposition in part because a new premium thimble will typically be custom built for a specific installation. Experienced suppliers, to reduce costly manufacturing mistakes, will often visit the prospective site of a repair or upgrade to closely verify the geometry of the separator to assure that the replacement thimble to be manufactured will fit the separator unit when it is delivered. This field study adds to basic costs and extends the delivery time of a replacement thimble.

Heretofore, premium replacement thimbles have been custom built, often on a rush basis, after a failure or the detection of an insipient failure. The aftermarket industry has generally not found it practical to build and inventory complete thimble units because of the variety of separator sizes in installed plants.

Cyclone separators operating at high temperature and subjected to corrosive materials have been susceptible to early thimble degradation in part, because of relatively large exposed metal areas. Prior thimble designs have been relatively expensive to manufacture, for example, because segments making up the circular thimbles were made with arcuate shapes that complicated their tooling, molding, and assembly.

SUMMARY OF THE INVENTION

The invention provides a thimble assembly for a cyclone separator that, using common parts, can be installed on cyclone units of a wide size range. The inventive technology allows a manufacturer to produce thimble parts with an economy of scale and to inventory the parts prior to receiving an order for a particular installation. The technology effectively eliminates lead times, is flexible enough to eliminate the need to confirm the size of the required unit by dispatching an agent of the manufacturer to the perspective installation site and eliminates engineering time to design custom parts.

Segments used to construct the inventive thimble are less expensive to manufacture and are longer lasting than prior art parts. The foregoing improvements and advantages as well as others will become apparent from the following description of the invention.

BRIEF DESCRIPTION OF THE DRAWINGS

FIG. 3 is a perspective view of a top row segment of the inventive thimble;

FIG. 3A is an elevational view of the top row segment of FIG. 3 with a right hand part of a refractory covering removed;

FIG. 3B is a cross-sectional view of the top row segment taken in a plane indicated at 3B-3B in FIG. 3A;

FIG. 3C is a top view of the top segment as modified in FIG. 3A;

FIG. 4 is a perspective view of a middle row segment of the inventive thimble;

FIG. 4A is an elevational view of the middle row segment of FIG. 4 with a right hand part of a refractory covering removed;

FIG. 4B is a cross-sectional view of the middle row segment taken in a plane indicated at 4B-4B in FIG. 4A;

FIG. 4C is a top view of the middle segment as modified in FIG. 4A;

FIG. 5 is a perspective view of a bottom row segment of the inventive thimble;

FIG. 5A is an elevational view of the bottom row segment of FIG. 5 with a right hand part of a refractory covering removed;

FIG. 5B is a cross-sectional view of the bottom row segment taken in a plane indicated at 5B-5B in FIG. 5A;

FIG. 5C is a top view of the bottom row segment as modified in FIG. 5A;

FIG. 6 is a perspective view of a segment mounting bracket;

FIG. 7 is a perspective view of a placement link;

FIG. 8 is a perspective view of a bottom segment row link assembly; and

FIG. 9 is a somewhat diagrammatic view of an installed mounting bracket and part of a top row segment suspended by the mounting bracket.

DESCRIPTION OF THE PREFERRED EMBODIMENT

Figure 1:
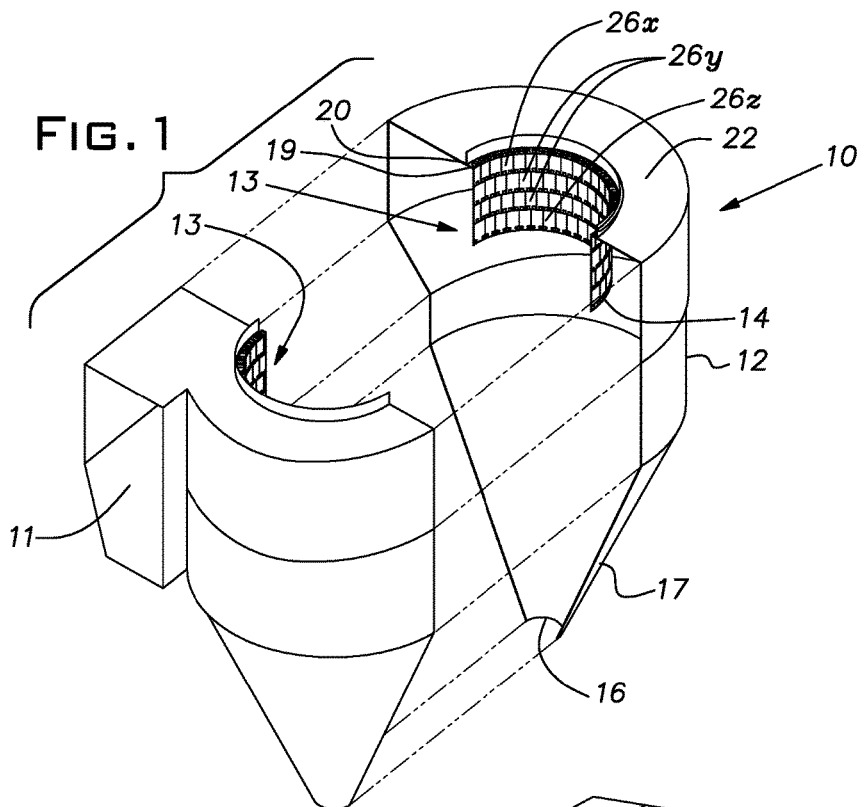
FIG. 1 is an exploded perspective view of a cyclone separator showing the thimble of the invention.

FIG. 1 illustrates a cyclone separator 10 of a type that is used, for example, in a lower hot stage of a cement manufacturing plant. A mixed phase of gases and solid particulate matter enters an inlet 11 of a housing 12. In the housing 12, the mixture swirls around a central thimble 13. Gases enter a lower open end 14 of the thimble 13, pass vertically upwardly through the interior of the thimble and exit the housing 12. Particulate matter descends in the housing 12 and exits through an outlet 16 in a conical bottom part 17 of the housing 12.

The thimble 13 is concentric with an opening 19 defining an inside diameter bounded by a shelf 21 formed by an upper wall 22 of the housing 12.

The shelf opening diameter of existing cyclone separators of the type under consideration here is generally in the range of 3 to 5 meters. The thimble 13 will have a nominal diameter corresponding to (technically smaller than) the diameter of the opening 19 formed by the shelf 21. It is customary to construct a thimble of loosely joined segments organized in axially draped circumferential rows.

In the illustrated thimble construction, all of the segments 26 of a particular row are identical and the segments of one row are different from another row, although the middle two rows have identical segments. Various segments 26x, 26y and 26z are shown in FIGS. 3, 4 and 5, respectively. Herein, when a number designation has no suffix letter x, y or z, the designation is intended to mean any one of the segments 26. This convention will be used with certain other elements of the segments 26. All of the segments 26 have a steel plate core 27x, 27y and 27z encased in a refractory 28x, 28y and 28z. The segments 26 are plate-like, being longer than they are wide. Each segment 26 has two pairs of tabs 29 projecting from an upper edge or face of the refractory 28. Pairs of the tabs 29 have aligned 1 1/16 inch holes 31 allowing the tab pairs to serve as a clevis 80 with a spacing 86 between the pair of tabs 29. The upper segments 26x (FIGS. 3, 3A-C) and the middle segments 26y (FIGS. 4, 4A-C) have plate areas with 1 1/16 inch holes or edge area holes 32 that are adapted to be received in the clevises formed by tabs 29 of an underlying segment 26. The plate cores 27 are rectangular steel plates of, for example, 3/16 inch thickness, 21 5/16 inch length and 8 15/16 inch width. The plate cores 27 are bent on a longitudinal center line so that half of the core plate is in a plane (82) 4.5 degrees from the plane 82 of the other half. The clevis tabs 29, made of 3/16 inch steel plate, are welded flat against opposite sides of a respective plate core 27 so that each tab pair diverges at the 4.5 degree angle from the other pair. A cantilevered upper part of a tab 29 is offset away from the opposite tab to provide a space of 7/16 inch, for example, therebetween.

Top edges of all of the plate cores 27 and bottom edges of the top and middle plate cores 27x, 27y are notched in a central zone thereby saving weight of material that would otherwise be unstressed and, therefore, a non-functional area.

The plate cores 27 including their ends are encased in the refractory 28 except for pockets 36 in an edge area 83 of the steel core, that receive clevis tabs 29 of the middle or bottom segments 26y, 26z or pockets 37 on the bottom segments 26z that receive link assemblies described below. The pockets 36 have a reverse taper 84 or undercut of, for example, 20 degrees.

FIGS. 3C, 4C and 5C show that the steel plate cores 27 are oriented so that an imaginary chord-like line between their respective longitudinal edges is parallel to opposite main faces 38x, 38y, 38z and 39x, 39y and 39z of their respective refractory 28x, 28y and 28z. The main faces or sides 38, 39 of each refractory 28 are parallel while narrow vertical sides or edge faces 40x, 40xa, 40y and 40z of each refractory 28x, 28y and 28z symmetrically diverge from one another at a shallow angle of, for example 9 degrees. Refractory with flat main faces is more efficient to production cast than prior art refractory with curved faces. By way of example, the refractories 28 can be 21 5/8 inch long, 12 1/16 inch wide at the major or main face 39 and 1 15/16 inch thick (the exception being the bottom row segment 26z having a refractory length of 23 5/8 inch). The minor main face 38 of a segment 26 when assembled in a thimble 13 faces the thimble interior.

The steel plate core 27x of the upper segments 26x has a pair of oval circular anchors 30 welded perpendicular to the planes of the core at the top and bottom notched central zone 33, 34. The anchors 30 can be the drops or slugs from punching 1 1/16 inch slots in brackets described below. The upper and lower cross hatched areas on the plate core 27x, depicted in FIG. 3A can be protected with a rubberized coating and the inner cross hatched area can be covered with an adhesion promoting coating.

The steel plate core 27y of the second and third middle row segments 26y and the steel plate core 27z of the bottom row segments 26z have D-shaped holes 45 punched in their mid-sections. Anchor discs 35, made from 1 1/16 inch hole drops are welded in the D-shaped holes 45 perpendicular to and centered across the plane of the plate cores 27y, 27z. The cross hatched area of the plate core 27y and anchors 35 shown cross hatched in FIG. 4A can be coated with a rubberized coating.

The bottom row segment plate core 27z is distinguished from the top and middle plate cores 27x and 27y by having its lower pin holes 32 with a greater center-to-center distance so that they are closer to the longitudinal edges of the plate core 27z.

Figure 2:
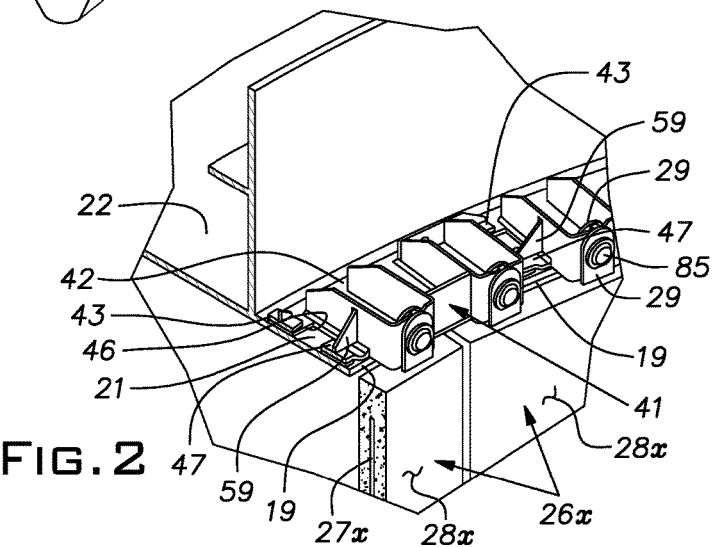
FIG. 2 is a fragmentary enlarged perspective view of a mounting area of the thimble.

FIG. 6 illustrates a mounting bracket 41 for suspending the thimble segments 26 by coupling with the top row of segments 26x. The bracket 41 is a weldment of shaped steel plates. A base 42 of the bracket can be made of 1/4 inch steel plate with the remaining bracket parts being made of 3/16 inch steel plate. The base 42 has a generally rectangular shape in plan view with a pair of tabs 43, 44 and 46, 47 at each end. A rear tab 43 on the right in FIGS. 6 and 2 is raised above a flat plane 94 of the base proper a distance corresponding to the thickness of the base plate 42. Similarly, a front tab 47 on the left in FIGS. 6 and 2 is raised above the base plane. Left and right hand U-shaped members 48, 49 are welded to opposite end areas of the base 42. A plate 51 welded flush with a front edge 52 of the base 42 is also welded to side legs of the members 48, 49 for reinforcement purposes. A center web 53, 54 of each of the members 48, 49 lies in a vertical plane and has a 1 1/16 inch wide oval hole 56. The stamped drops from the holes 56 can be used for the anchors 30 of the top segment plate cores 27x. The center webs 53, 54 are suspended a distance from the base plate front edge 52 a distance considerably greater than the thickness of the segment tabs 29. The planes of the center webs 53, 54 are out of parallelism by a small angle 81, 81a of 4.5 degrees, the same angle as the divergence of the pairs of segment tabs 29. In such a manner that they are symmetrical with a line perpendicular to the front edge 52 of the base 42. The oval holes 56 are centered, for example, at 6 3/16 inch so that they correspond with the spacing between pairs of tab holes 31 of a segment 26. Gusset plates 58, 59 (FIG. 2) reinforce the elevated tabs 43, 47. Upper edges of the webs 53, 54 are shaped to provide small upstanding tabs 61.

A thimble 13 is installed piecemeal circumferentially along the perimeter of the shelf opening 19. The brackets 41 are arranged around the shelf ID with the tabs 43-47 overlying or underlying the tabs of adjacent brackets. This process is assisted by use of placement links 71 illustrated in FIG. 7. A link 71 bridging each adjacent pair of brackets 41 has rectangular holes 72 that fit over the bracket tabs 61 of adjacent brackets to properly space the adjacent brackets. When all of the brackets 41 are properly positioned, the overlying and underlying tabs 43-47 can be welded together and the base 42 of the brackets can be welded on the shelf. Thereafter, the rows of segments 26 are suspended from the brackets 41. The upper segments 26x are individually raised with their tab 29 straddling the webs 53, 54 of adjacent brackets. When the tab holes 31 and bracket web holes 56 are aligned, a short steel pin 85 of, for example 1 inch diameter is installed in these holes. The pins 85 can have steel washers pre-welded on one end and be secured after the pins are in place by steel washers welded on the opposite end. For economy, the pin washers can be formed from material blanked out of the plate cores 27 to form the central notches at the top and bottom of the segments 26.

Successive rows of segments 26y, 26z are similarly installed by raising a segment so that its tabs 29 straddle exposed lower holes 32 in two adjacent segments of the preceding segment row. One inch pins, as just described, are installed in the aligned tab and segment core holes 31, 32. The segments 26z of the bottom row of segments are stabilized by coupling adjacent segments together with a link assembly 76 illustrated in FIG. 8. Steel pins 77, again 1 inch in diameter, are pre-welded to a steel link 78. The pre-welded pins 77 are inserted in lower holes 32 of adjacent plate cores 27z and another steel link 79 of the assembly 76 at opposite faces of the segments is installed and welded on the inserted pin ends.

Areas of the refractory 28 excluded from a segment 26 for clearance of the tabs 29 or link assembly 76 can be filled with refractory after the connecting pins are in place and the retainer washers and links 78 are welded on. The undercut or reverse taper of the clearance formations or pockets 36 assist in holding the filled in refractory.

In accordance with the invention, the number of mounting brackets 41 to be used is determined by the inside diameter of the shelf 18. Study has revealed that a large majority of existing cyclone separators of the type under consideration here have a nominal diameter between 3 meters and 5 meters. The geometry of the disclosed mounting bracket 41 and segments 26 is based on use of 4 meters as an average or mean of these diameter dimensions and with sufficient clearance in their joints to allow them to conform to 3 meter to 5 meter shelf inside diameters. The disclosed inventive brackets 41 are configured to be practically located radially in relation to a shelf edge 19 (FIG. 9) in a range of 2 inches (51 mm.). This allows the brackets 41 to cover any shelf inside diameter (ID) in the 3 meter to 5 meter range since the addition or removal of one bracket 41 (and the corresponding addition or removal of one staggered column of segments 26) will change the diameter nominally by 4 inches. This relationship comes from the essential equality of the arc length and the effective chord length of a bracket 41 or segment 26, on a circle at a shelf ID spanned by a bracket or a segment. This arcuate/chordal span or length is the center to center spacing of adjacent brackets 41 or segments 26, 12 3/8 inches, which is twice the center to center distance of the bracket holes 56, 6 3/16 inches. A change in circumference of 12 3/8 inches effects a change in diameter of 4 inches (12 3/8÷π) or a radius change at the shelf ID of 2 inches.

For the bracket 41 to have adequate tooting on the shelf 21, the bracket should have a radial width more than twice the difference between a minimum and a maximum shelf ID, this difference in the illustrated case is 2 inches shown in FIG. 9. As a rule, based on the foregoing, the base should preferably have a radial width dimension that is at least 1/3 the effective chord length of the bracket.

Clearance of the 1 inch diameter pins in the 1 1/16 inch holes and the 7/16 inch gap between pairs of tabs 29 receiving 3/16 inch plate core material, assures that the parts can be easily field assembled regardless of the shelf ID and corresponding number of brackets 41 and segments 26 being used.

It should be evident that this disclosure is by way of example and that various changes may be made by adding, modifying or eliminating details without departing from the fair scope of the teaching contained in this disclosure. For example, the dimensions referenced in this disclosure are only exemplary and may be varied to suit the circumstances. It is expected that a thimble can be constructed of only three rows of segments or more than four rows of segments. The invention is therefore not limited to particular details of this disclosure except to the extent that the following claims are necessarily so limited.

What is claimed is:

1. A thimble assembly for a cyclone separator, the thimble assembly comprising a plurality of mounting brackets mounted on a shelf of the separator along the perimeter of a circular exhaust opening, a plurality of segments vertically successively suspended from the brackets, the segments of an upper row being joined to the brackets, the segments of each successive lower row being joined to the segments of a row immediately above, each bracket exclusively serving a first portion of the perimeter, each first portion having a first length, each segment of the upper row exclusively serving a second portion of the perimeter, each second portion having a second length, the first length being the same as the second length, each segment having a steel core encased in a refractory, wherein said steel core is a plate bent into two planes at a central vertical line, wherein the thimble assembly is adapted and configured for installation on the cyclone separator.

2. A thimble assembly as set forth in claim 1, wherein the refractory has major opposed parallel flat faces.

3. A thimble assembly as set forth in claim 1, each bracket having an upstanding tab adapted to engage a formation of a placement link so that a relative spacing of a pair of adjacent brackets can be set.

4. A thimble assembly according to claim 1, wherein each bracket has a base with a lower surface lying in a flat plane, the lower surface of the base having a radial width with reference to a center of the thimble that is at least 1/3 of a length of a chord serving said first portion.

5. A thimble assembly as set forth in claim 1, wherein each bracket has (a) a tab that underlies a tab of an adjacent bracket and (b) a tab that overlies a tab of an adjacent bracket.

6. A thimble assembly as set forth in claim 5, wherein an overlying tab of an installed bracket is welded to an underlying tab of an adjacent installed bracket.

7. A thimble assembly as set forth in claim 1, wherein two pairs of projecting tabs extend from the steel core, each pair of tabs forming a clevis and defining a pair of aligned holes adjacent an end of the clevis.

8. A thimble assembly as set forth in claim 7, wherein a spacing between the holes of one clevis is equal to a spacing between the holes of the other clevis.

9. The thimble assembly of claim 7, wherein each pair of tabs defines a plane, the planes defined by the tabs being displaced from each other by an angle of 4.5 degrees.

10. A thimble assembly for a cyclone separator, the thimble assembly comprising a plurality of mounting brackets mounted on a shelf of the separator along the perimeter of a circular exhaust opening, a plurality of segments vertically successively suspended from the brackets, the segments of an upper row being joined to the brackets, the segments of each successive lower row being joined to the segments of a row immediately above, each bracket exclusively serving a first portion of the perimeter, each first portion having a first length, each segment of the upper row exclusively serving a second portion of the perimeter, each second portion having a second length, the first length being the same as the second length, each segment having a steel plate core encased in a refractory, wherein said steel plate core is bent into two flat planes that are displaced a small angle from each other, wherein the thimble assembly is adapted and configured for installation on the cyclone separator.

11. The thimble assembly of claim 10, wherein the small angle is 4.5 degrees.

12. A thimble assembly as set forth in claim 10, wherein the refractory has two opposed main faces that are parallel to one another, the steel core being arranged so that a bi-sector of the small angle is perpendicular to said main faces.

13. A thimble assembly as set forth in claim 12, wherein the refractory has edge faces extending between said main faces, said edge faces being in divergent planes.

14. The thimble assembly of claim 13, wherein the divergent planes diverge by 9 degrees.

15. A thimble assembly as set forth in claim 12, wherein the refractory encases at least a portion of an end of the steel core continuously between said main faces.

16. A thimble assembly as set forth in claim 12, wherein anchor discs are welded in holes in a mid-section of the steel core transverse to and centered on a plane defined by the steel core to anchor the refractory.

17. A thimble assembly as set forth in claim 12, wherein the refractory of a segment adjacent and surrounding a portion of a hole in an edge area of the steel core has a reverse taper adapted to retain a filler refractory applied over the hole in the edge area after the segment is assembled with other segments with a pin positioned in said hole in the edge area.

18. A kit for constructing a circular thimble for a cyclone separator, the kit comprising a plurality of mounting brackets and a plurality of segments, each mounting bracket having a base extending in a plane, the plurality of segments being of a number at least three times the number of mounting brackets, each segment having a steel core encased in a refractory, the steel core being a plate bent into two planes at a central vertical line, wherein the plurality of mounting brackets and the plurality of segments are adapted and configured to provide the circular thimble for installation on the cyclone separator.

19. A thimble assembly, the thimble assembly being installed on a cyclone separator along a perimeter of an exhaust opening of the separator, the thimble assembly comprising a plurality of mounting brackets and a plurality of segments, the plurality of segments being of a number at least three times the number of mounting brackets, each segment having a steel core encased in a refractory, the steel core being a plate bent into two planes at a central vertical line.

* * * * *